(12) United States Patent
Mallick et al.

(10) Patent No.: US 11,397,540 B2
(45) Date of Patent: Jul. 26, 2022

(54) WRITE PRESSURE REDUCTION FOR REMOTE REPLICATION

(71) Applicant: EMC IP Holding Company LLC, Hopkinton, MA (US)

(72) Inventors: Sanjib Mallick, Bangalore (IN); Vinay G. Rao, Bangalore (IN); Krishna Deepak Nuthakki, Bangalore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/068,352

(22) Filed: Oct. 12, 2020

(65) Prior Publication Data

US 2022/0113891 A1 Apr. 14, 2022

(51) Int. Cl.
*G06F 3/06* (2006.01)
(52) U.S. Cl.
CPC .......... *G06F 3/0655* (2013.01); *G06F 3/0604* (2013.01); *G06F 3/065* (2013.01); *G06F 3/0679* (2013.01)
(58) Field of Classification Search
CPC ...... G06F 3/0655; G06F 3/065; G06F 3/0679; G06F 3/0604
USPC ........................................................ 711/154
See application file for complete search history.

(56) References Cited

U.S. PATENT DOCUMENTS

| 6,567,397 | B1 | 5/2003 | Campana et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Than Nguyen
(74) *Attorney, Agent, or Firm* — Ryan, Mason & Lewis, LLP (57) ABSTRACT

An apparatus comprises at least one processing device that is configured to send write requests to a first storage system. The first storage system is configured to participate in a replication process in which data associated with the write requests is replicated from the first storage system to a second storage system that is separate from the first storage system. The at least one processing device is further configured to receive from the first storage system an indication of a write pressure condition arising in the second storage system and relating to replication of the data associated with the write requests from the first storage system to the second storage system, and to at least temporarily limit a manner in which additional write requests are sent to the first storage system responsive to the received indication of the write pressure condition arising in the second storage system.

20 Claims, 4 Drawing Sheets

(56) References Cited

U.S. PATENT DOCUMENTS

| | | | |
|---|---|---|---|
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,825,919 B1 | 9/2014 | Lim et al. | |
| 8,832,334 B2 | 9/2014 | Okita | |
| 8,874,746 B1 | 10/2014 | Gonzalez | |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,417,907 B1* | 8/2016 | Dire | G06F 9/4806 |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,254,970 B1* | 4/2019 | Martin | G06F 3/061 |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,831,387 B1* | 11/2020 | Venkatesan | G06F 3/0632 |
| 11,012,512 B1* | 5/2021 | Mallick | H04L 67/1097 |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0201458 A1 | 8/2008 | Salli | |
| 2008/0301332 A1 | 12/2008 | Butler et al. | |
| 2009/0259749 A1 | 10/2009 | Barrett et al. | |
| 2010/0313063 A1 | 12/2010 | Venkataraja et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0311729 A1* | 11/2013 | Navarro | G06F 11/3409 711/154 |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2016/0378349 A1* | 12/2016 | Wigmore | G06F 3/0647 711/165 |
| 2017/0235507 A1 | 8/2017 | Sinha et al. | |
| 2018/0046552 A1* | 2/2018 | Madhavarapu | G06F 11/2094 |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348863 A1* | 11/2020 | Venkatesan | G06F 9/5011 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices.".

U.S. Appl. No. 16/710,828 filed in the name of Amit Pundalik Anchi et al. filed Dec. 11, 2019, and entitled "Automated Seamless Migration with Signature Issue Resolution."

* cited by examiner

WRITE PRESSURE REDUCTION FOR REMOTE REPLICATION

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication and/or synchronous replication. For example, asynchronous replication may be configured to periodically transfer data in multiple cycles from a source site to a target site, while synchronous replication may be configured to mirror host writes from the source site to the target site as the writes are made at the source site. In some implementations of synchronous replication, a given host write is acknowledged back to the host by the source site only after that host write has been transmitted by the source site to the target site and acknowledged back to the source site by the target site.

Storage systems participating in a given replication process can be configured to support an asynchronous replication mode, a synchronous replication mode, or both asynchronous and synchronous replication modes. In such replication arrangements, issues can arise if the target storage system experiences write pressure conditions while the source storage system is not experiencing write pressure conditions.

SUMMARY

Illustrative embodiments provide techniques for reducing write load or otherwise reducing write pressure in cases of remote replication. For example, the remote replication in some embodiments involves synchronous replication between a first storage system at a local source site and a second storage system at a remote target site. In these and numerous other remote replication arrangements, the disclosed techniques can advantageously reduce write pressure in the second storage system, even if only the first storage system has direct connectivity to one or more host devices that are generating IO operations. The term "remote replication" as used herein is intended to be broadly construed, so as to encompass a wide variety of arrangements involving at least one of synchronous replication and asynchronous replication between source and target storage arrays or other types of storage systems.

In one embodiment, an apparatus comprises at least one processing device that includes a processor and a memory, with the processor being coupled to the memory. The at least one processing device is configured to send write requests to a first storage system, where the first storage system is configured to participate in a replication process in which data associated with the write requests is replicated from the first storage system to a second storage system that is separate from the first storage system.

The at least one processing device is further configured to receive from the first storage system an indication of a write pressure condition arising in the second storage system and relating to replication of the data associated with the write requests from the first storage system to the second storage system, and to at least temporarily limit a manner in which additional write requests are sent to the first storage system responsive to the received indication of the write pressure condition arising in the second storage system.

In some embodiments, the first and second storage systems comprise, for example, respective distinct production and recovery storage arrays at respective different physical sites. Numerous alternative storage system arrangements are possible.

The first and second storage systems may be arranged in an active-active configuration relative to one another.

Additionally or alternatively, the first storage system in some embodiments has direct connection to one or more host devices that generate the write requests, but the second storage system has no direct connection to the one or more host devices that generate the write requests. For example, the first storage system is illustratively one of a plurality of host-connected source storage arrays having direct connections to one or more host devices and the second storage system comprises a target storage array having no direct connection to the one or more host devices but instead configured to serve as a replication target for each of the plurality of host-connected source storage arrays. Other arrangements of multiple host-connected storage arrays and one or more non-host-connected storage arrays can be used in remote replication arrangements with write pressure reduction functionality as disclosed herein.

In some embodiments, the above-noted at least one processing device illustratively comprises at least a portion of a host device configured to generate the write requests. The processing device may comprise a multi-path input-output (MPIO) driver of the host device, with the MPIO driver being configured to control the delivery of the write requests to the first storage system over selected ones of a plurality of paths through a network. The paths are illustratively associated with respective initiator-target pairs, with the initiators of the initiator-target pairs in some embodiments comprising respective host bus adaptors (HBAs) of the host device and the targets of the initiator-target pairs comprising respective storage array ports of the storage system. Other types of initiators and targets can be used in other embodiments.

Accordingly, at least portions of the disclosed functionality can be managed in some embodiments by a host driver, such as an MPIO driver, in conjunction with processing of IO operations. The MPIO driver is illustratively part of a multi-path layer that is configured to process IO operations of at least one host device that communicates with one or more storage arrays or other types of storage systems. Also, other types of host drivers can be used in place of or in addition to one or more MPIO drivers.

In some embodiments, the indication of the write pressure condition arising in the second storage system that is received from the first storage system comprises at least one of a check-condition notification and a queue-full notification that is sent by the first storage system to indicate the write pressure condition arising in the second storage system even though the first storage system is not itself experiencing any write pressure condition.

Additionally or alternatively, at least temporarily limiting a manner in which additional write requests are sent to the first storage system responsive to the received indication of the write pressure condition arising in the second storage system comprises reducing a rate at which the additional write requests are sent to the first storage system. Other types of limitations can be used in other embodiments, such as limits on at least one of the number and the size of write requests sent for a particular period of time.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
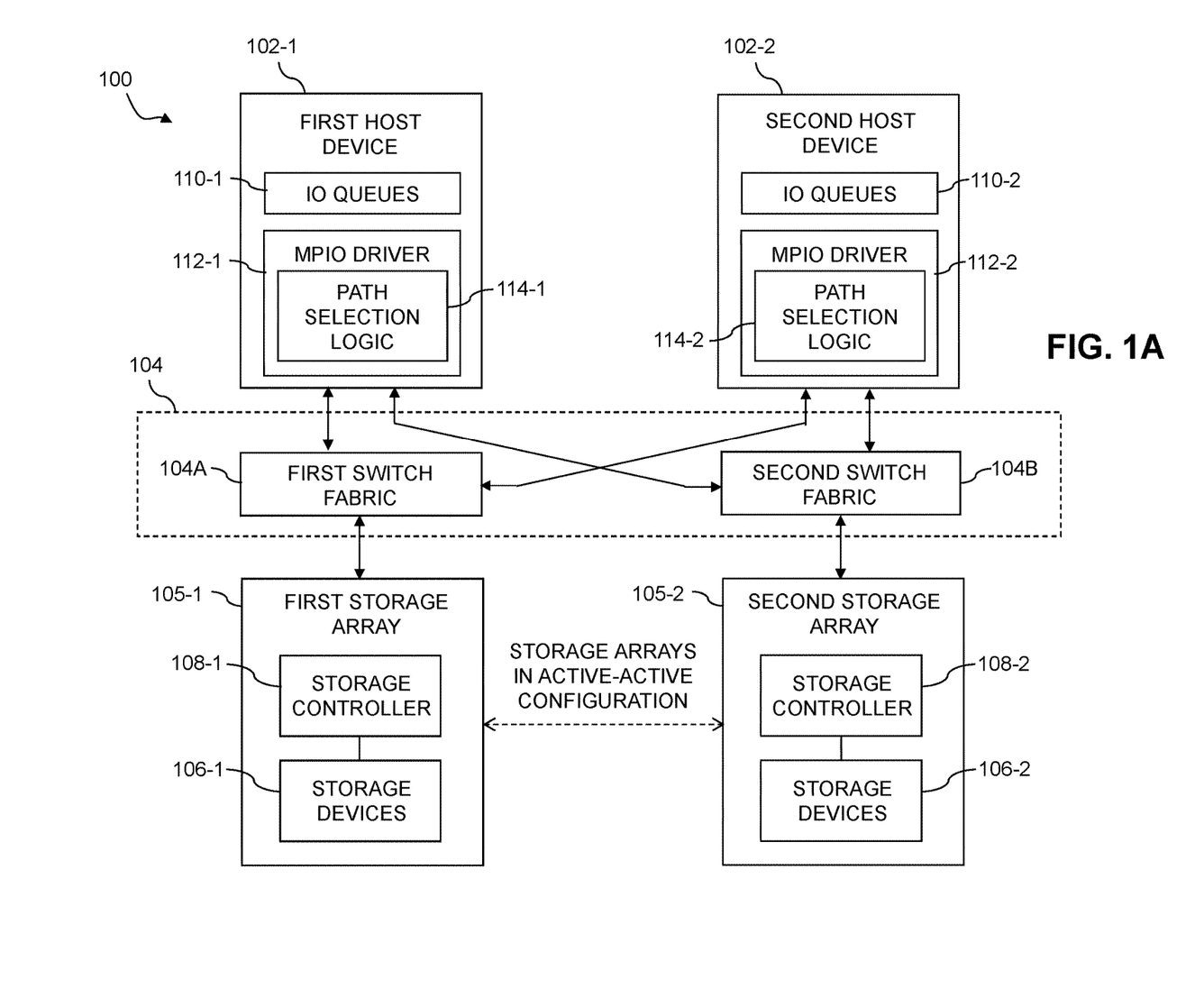
FIGS. 1A and 1B are block diagrams of example information processing systems configured with functionality providing write pressure reduction for remote replication in an illustrative embodiment.

FIG. 1A shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises at least first and second switch fabrics 104A and 104B. The host devices 102 communicate over the network 104 via switch fabrics 104A and 104B with at least first and second storage arrays 105-1 and 105-2, collectively referred to herein as storage arrays 105. For example, the network 104 illustratively comprises at least one storage area network (SAN) and the fabrics 104A and 104B illustratively comprise respective distinct switch fabrics of a set of multiple switch fabrics interconnecting the host devices 102 with the storage arrays 105 over the one or more SANs. Each of the fabrics 104A and 104B in some embodiments is associated with a different SAN.

The system 100 is configured such that the first host device 102-1 communicates with the first storage array 105-1 over the first switch fabric 104A and communicates with the second storage array 105-2 over the second switch fabric 104B. Similarly, the second host device 102-2 communicates with the first storage array 105-1 over the first switch fabric 104A and communicates with the second storage array 105-2 over the second switch fabric 104B. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102, two switch fabrics 104A and 104B and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, commercially available from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Small Computer System Interface (SCSI), Internet SCSI (iSCSI), Serial Attached SCSI (SAS) and Serial Advanced Technology Attachment (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1A embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage arrays 105-1 and 105-2 are illustratively arranged in an active-active configuration, although other storage configurations can be used in other embodiments. In an example of an active-active configuration that may be used, data stored in one of the storage arrays 105 is replicated to the other one of the storage arrays 105 utilizing a synchronous replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The storage arrays 105-1 and 105-2 are therefore assumed to be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

The synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

It is assumed that the storage controllers 108 of the respective storage arrays 105 each comprise replication control logic and a snapshot generator. The replication control logic illustratively controls performance of the above-noted synchronous replication process, or other replication processes in other embodiments. The snapshot generator is used to generate snapshots of one or more storage volumes that are subject to synchronous replication in conjunction with active-active storage clustering. Again, other types of storage configurations can be used in other embodiments.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group. In some embodiments, a snapshot tree for a storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for write pressure reduction. Other types of MPIO drivers from other driver vendors may be suitably modified to incorporate functionality for write pressure reduction as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

Other host device components can additionally or alternatively perform at least portions of controlling delivery of IO operations over selected paths, such as one or more host device processors or other control logic instances. Illustrative embodiments are therefore not limited to arrangements in which MPIO drivers perform such delivery control functions for IO operations. Moreover, terms such as "controlling delivery" of an IO operation as used herein are intended to be broadly construed so as to encompass, for example, selecting from a plurality of paths a particular path over which a particular IO operation is to be sent to one of the storage arrays 105, and sending the IO operation over that path.

In the FIG. 1A embodiment, the network 104 comprises first and second switch fabrics 104A and 104B through which the first and second host devices 102-1 and 102-2 are cross-connected to the first and second storage arrays 105-1 and 105-2 as shown. This example cross-connected arrangement supports active-active configuration of the storage arrays 105 for the multiple host devices 102, although other replication arrangements can be used in other embodiments.

Figure 1B:
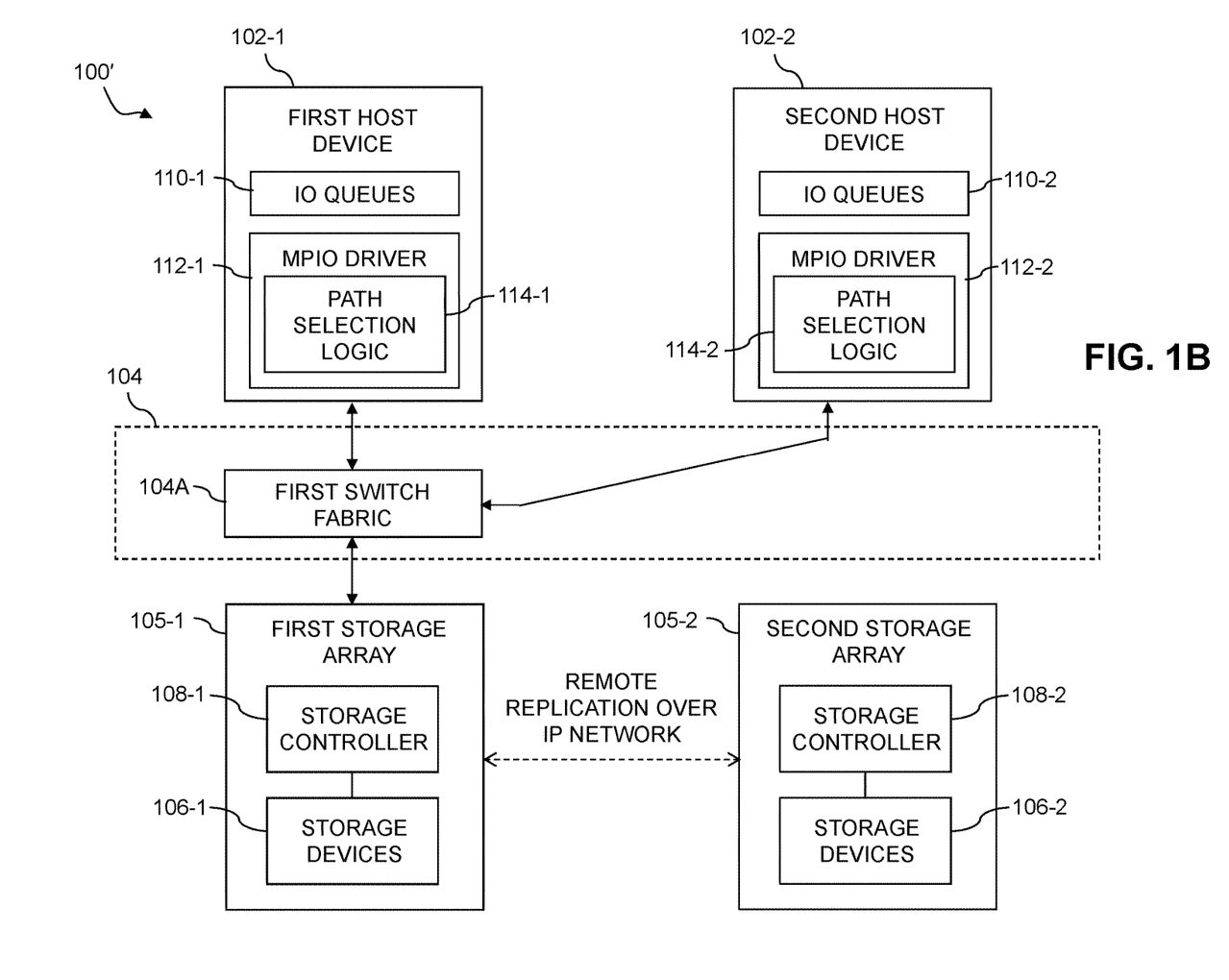

FIG. 1B shows one possible alternative configuration of system 100. In this embodiment, an information processing system 100' is configured in a manner similar to that previously described for system 100, but the second storage array 105-2 does not have a direct connection via SAN 104 to either of the first and second host device 102. Instead, the second storage array 105-2 is configured for remote replication relative to the first storage array 105-1 without having direct connections to the host devices 102. Such remote replication illustratively occurs over an IP network in the FIG. 1B embodiment, although, as indicated elsewhere herein, other types of networks can be used.

As indicated previously, storage arrays 105 participating in a given replication process can be configured to support an asynchronous replication mode, a synchronous replication mode, or both asynchronous and synchronous replication modes. In such replication arrangements, issues can arise if the target storage system experiences write pressure conditions while the source storage system is not experiencing write pressure conditions.

For example, in remote replication environments (e.g., synchronous replication and/or asynchronous replication), the host sends a given write command to one storage array (referred to as the "local" storage array), and that storage array forwards the data to the other storage array (referred to as the "remote" storage array) in accordance with a selected remote replication policy. The local storage array is therefore defined as the storage array which receives the given write command from the host, and the remote storage array is defined as the storage array which is being updated by the local array.

In general, each of the storage arrays can serve different roles for different write commands sent from different hosts, possibly even for the same logical storage device, but each specific write command may be sent from a host to only one of the storage arrays. For example, in an active-active arrangement with synchronous replication, each storage array may serve as both "local" and "remote" for a given logical storage device but for a given write command only one of the storage arrays (i.e., the storage array that received the given write command from the host) is the local array and the other is the remote array.

Various techniques can be used to allow a storage array to relieve a write pressure condition upon receiving write commands from the host. These include the storage array returning a specialized check-condition ("chk-cond") notification, a queue-full notification, or other indication to the host to indicate to an MPIO layer of that host that a write pressure condition exists. When receiving such an indication, the MPIO layer slows down the stream of write commands that are sent from the host.

However, in some cases involving remote replication, the write pressure is actually occurring on the remote array, which illustratively has no direct connection to the host sending the write commands. As a result, the remote array cannot signal the host to slow down the rate at which write commands are sent to the local array (which eventually arrive to the remote array and contribute to the write pressure on the remote array). Thus, the write pressure on the remote array may be caused by writes coming from a directly connected host (as in the case of active-active remote replication) or writes from the other ("local") array.

Illustrative embodiments disclosed herein provide an improved approach in which multi-pathing software running on a host device interacts with a storage array to provide functionality for reducing write load in cases of remote replication. These techniques address and overcome the above-described drawbacks by providing techniques for reducing write load in cases of remote replication. Such reduction of write load is considered an example of "write pressure reduction" as that latter term is broadly used herein.

For example, in the embodiments of FIGS. 1A and 1B, the remote replication illustratively involves synchronous replication between the first storage array 105-1 at a local source site and the second storage array 105-2 at a remote target site. In these and numerous other remote replication arrangements, the disclosed techniques can advantageously reduce write pressure in the second storage array 105-2, even if only the first storage array 105-1 has direct connectivity to one or more host devices 102 that are generating IO operations. The term "remote replication" as used herein is intended to be broadly construed, so as to encompass a wide variety of arrangements involving at least one of synchronous replication and asynchronous replication between source and target storage arrays or other types of storage systems.

Example write load reduction techniques will now be described in further detail with reference to a particular one of the host devices 102, namely host device 102-1 comprising MPIO driver 112-1, interacting with the first storage array 105-1, using either the cross-connected arrangement of FIG. 1A or the alternative arrangement of FIG. 1B.

In operation, the host device 102-1 via its MPIO driver 112-1 sends write requests to the first storage array 105-1, where the first storage array 105-1 is configured to participate in a replication process in which data associated with the write requests is replicated from the first storage array 105-1 to the second storage array 105-2 that is separate from the first storage array 105-1. For example, the first and second storage arrays 105 may comprise respective distinct production and recovery storage arrays at respective different physical sites, such that the first and second storage arrays 105 are physically separate and remote from one another. Additionally or alternatively, the first and second storage arrays 105 may be arranged in an active-active configuration relative to one another. The write requests are examples of what are also referred to herein as IO operations. Such IO operations are illustratively sent from the host device 102-1 to a given one of the storage arrays 105 utilizing commands of a particular storage protocol, such as a SCSI protocol or an NVMe protocol. The write requests are therefore also referred to herein as write commands.

Furthermore, the host device 102-1 via its MPIO driver 112-1 receives from the first storage array 105-1 an indication of a write pressure condition arising in the second storage array 105-2 and relating to replication of the data associated with the write requests from the first storage array 105-1 to the second storage array 105-2, and at least temporarily limits a manner in which additional write requests are sent to the first storage array 105-1 responsive to the received indication of the write pressure condition arising in the second storage array 105-2. The host device 102-1 comprising MPIO driver 112-1 is an example of what is more generally referred to herein as a processing device comprising a processor coupled to a memory. Other embodiments can implement write pressure reduction techniques of the type disclosed herein in other types of processing devices, including host devices or other processing devices that do not include MPIO drivers. Accordingly, it is to be appreciated that references herein to MPIO drivers or multi-path layers performing certain functions are by way of example only, and not intended to be limiting in any way.

In some embodiments, the first storage array 105-1 has direct connection to the host device 102-1 that generates the write requests, but the second storage array 105-2 has no direct connection to the host device 102-1 that generate the write requests. The embodiment of FIG. 1B is an example of such an arrangement.

It is also possible that there may be multiple source storage arrays that are performing replication to a single target storage array. For example, the first storage array 105-1 may be one of a plurality of host-connected source storage arrays having direct connections to one or more of the host devices 102 and the second storage array 105-2 may be a target storage array having no direct connection to the one or more host devices 102 but instead configured to serve as a replication target for each of the plurality of host-connected source storage arrays. Numerous other arrangements of multiple source and target storage arrays are possible in other embodiments.

The indication of the write pressure condition arising in the second storage array 105-2 that is received in the host device 102-1 from the first storage array 105-1 illustratively comprises at least one of a check-condition notification and a queue-full notification. Such a notification is sent by the first storage array 105-1 to the host device 102-1 to indicate to the host device 102-1 the write pressure condition detected by the first storage array 105-1 as arising in the second storage array 105-2, even though the first storage array 105-1 is not itself experiencing any write pressure condition. The notification in such embodiments does not necessarily identify to the host device 102-1 whether the write pressure condition arises in the first storage array 105-1 or the second storage array 105-2, although it is possible in some embodiments that the notification may be so configured.

In some embodiments, at least temporarily limiting a manner in which additional write requests are sent to the first storage array 105-1 responsive to the received indication of the write pressure condition arising in the second storage array 105-2 comprises reducing a rate at which the additional write requests are sent to the first storage array 105-1. For example, the rate can be reduced from a first relatively high rate of sending write requests to a second relatively low rate of sending write requests, illustratively at least in part under the control of the path selection logic 114-1 of the MPIO driver 112-1. Other types of limitations can be used in other embodiments, such as, for example, limits on at least one of the number and the size of write requests sent for a particular period of time.

Such a reduction can be for a designated period of time, with an automatic reversal of the reduction at the end of the period of time, or can continue for as long as the write pressure condition continues to be detected by the first storage array 105-1. Accordingly, in some embodiments, a temporary limitation in the manner in which additional write requests are sent from the host device 102-1 to the first storage array 105-1 continues until such time that the first storage array 105-1 provides an indication to the host device 102-1 that the previously-detected and signaled write pressure condition no longer exists.

The host device 102-1 can also respond to write pressure conditions arising in the first storage array 105-1. For example, the host device 102-1 via its MPIO driver 112-1 may be further configured to receive from the first storage array 105-1 an indication of a write pressure condition arising in the first storage array 105-1, and to at least temporarily limit a manner in which additional write requests are sent to the first storage array 105-1 responsive to the received indication of the write pressure condition arising in the first storage array 105-1.

Accordingly, in some embodiments, write pressure reduction is advantageously provided both for write pressure conditions arising in the second storage array 105-2 and indirectly signaled to the host device 102-1 via the first storage array 105-1, and also for write pressure conditions arising in the first storage array 105-1 and directly signaled to the host device 102-1 by the first storage array 105-1.

Although in the present embodiment and other embodiments herein MPIO drivers are used to perform write pressure reduction in conjunction with remote replication, this is by way of illustrative example only, and other host device components can alternatively implement at least portions of such write pressure reduction functionality. Accordingly, write pressure reduction functionality in some embodiments can be distributed across multiple host device components, possibly including MPIO drivers in combination with other host device components such as host device processors and associated control logic instances.

As described above, the MPIO driver 112-1 in some embodiments is configured to at least temporarily limit a manner in which write requests are delivered from the host device 102-1 to the first storage array 105-1. The MPIO driver 112-1 illustratively maintains one or more data structures that specify each path or set of paths associated with a given logical storage device to which IO operations may be directed by the MPIO driver 112-1, including information characterizing the particular HBA and storage array port that are the respective initiator and target for each such path.

In some embodiments, the MPIO driver 112-1 in limiting a manner in which write requests are delivered from the host device 102-1 to the first storage array 105-1 is more particularly configured, for example, to modify the operation of a load balancing algorithm or other path selection algorithm implemented by the path selection logic 114-1.

For example, the MPIO driver 112-1 can illustratively modify the operation of a load balancing algorithm that it uses in path selection in the path selection logic 114-1 based at least in part on the write pressure condition detected and signaled by the first storage array 105-1 so as to reduce a rate at which write requests are delivered by the host device 102-1 to the first storage array 105-1. Such a reduction in the rate at which write requests are delivered from the host device 102-1 to the first storage array 105-1 is illustratively implemented only for one or more logical storage devices that are each subject to replication from the first storage array 105-1 to the second storage array 105-2. For example, the rate reduction can be implemented for multiple logical storage devices that are part of a designated consistency group subject to ongoing synchronous or asynchronous replication.

Illustrative embodiments therefore provide functionality for reducing write load in cases of remote replication, with at least portions of that functionality being implemented using one or more MPIO drivers 112 of a multi-path layer of one or more host devices 102. The MPIO drivers 112 can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers, or additional or alternative host device components, can be used in other embodiments.

In some embodiments, MPIO drivers 112 of the host devices 102 illustratively have connectivity to an MPIO management station, such as a PowerPath® Management Appliance (PPMA) or other type of centralized management server or set of servers that has access to one or both of the storage arrays 105, from which the MPIO drivers 112 can obtain storage array related information, in addition to or in place of obtaining such information directly from one or both of the storage arrays 105.

Some embodiments are configured to support seamless migration. For example, in PowerPath® Migration Enabler (PPME), and more specifically in PPME-OR, where OR denotes Open Replicator, data of one or more logical storage devices subject to seamless migration is copied from a source array to a target array. Other types of migration, as well as other activities such as backups, can be similarly supported, in addition to synchronous and/or asynchronous replication processes.

In a datacenter or other type of information processing system, storage to host connectivity is usually via one or more SAN fabrics. These SAN fabric configurations can include multiple fabric switches with LUNs made visible to a host through multiple paths based on zone configuration and physical connectivity.

Multi-pathing software residing on the host device (e.g., a server such as an ESXi server or an AIX server) is utilized in illustrative embodiments to provide reduced write load in cases of remote replication. It is more particularly assumed in some embodiments that such multi-pathing software configured as disclosed herein is installed on the hosts and handles load balancing of IO operations across available paths between respective initiator-target pairs. The initiators are assumed to include respective HBAs, and the targets illustratively comprise respective storage array ports.

In such an embodiment, a remote storage array under write pressure, such as the second storage array 105-2, will indicate to the local array (i.e., the array receiving the host write commands from the host device 102-1 and sending them to the array under pressure, illustratively the first storage array 105-1) that it is under write pressure. The local array will then notify the MPIO layer of the host device 102-1 sending the write commands, possibly using indicators of the type described above, so that the MPIO layer will lower the rate at which write commands are sent, thus lowering the write pressure on the remote array that is currently experiencing the write pressure. This particular algorithm is presented by way of illustrative example only, and other embodiments can use other types of algorithms to provide the disclosed functionality for reducing write load in cases of remote replication.

Illustrative embodiments provide significant advantages over conventional practice. For example, the disclosed techniques can have a local array slow the host write rate even if the local array itself is not overly loaded by one or more hosts.

As indicated above, storage array write pressure might be caused due to hosts writing to a storage array directly or writes arriving at the array from the other array in a remote replication environment. Each array receiving writes from the hosts in illustrative embodiments herein can determine whether the write pressure is caused by the hosts or by the write commands it sends to the other array. If the write pressure is caused by the hosts, then the local array can use the existing techniques to slow down the write rate from the hosts, but if it is caused by writes arriving from the other array, the disclosed techniques are used to relieve the write pressure in that illustrative situation.

Some embodiments involve utilization of a storage array configuration that is referred to herein as a "bunker box." Such a bunker box illustratively comprises a storage array that does not have any hosts directly connected to it, but serves as a remote array relative to one or more arrays that are directly connected to hosts. The bunker box storage array is therefore protected from any directly attached host getting hacked and comprising the data stored in the bunker box storage array. It is common for the bunker box storage array to be relatively under-powered relative to the host-connected storage arrays. For example, an older storage array may be used as the bunker box storage array, as it only processes replication load, and so performance is not as much of an issue as it would be for the host-connected storage arrays. Illustrative embodiments herein can advantageously prevent situations in which the bunker box storage array might otherwise become overloaded due to excessive numbers of write commands arriving from each of multiple ones of the host-connected storage arrays. Similar advantages are provided in numerous other remote replication environments and configurations.

Portions of the above-described algorithm and other related techniques and functionality disclosed herein are illustratively implemented at least in part by a given MPIO driver on a corresponding host device, and similarly by other MPIO drivers on respective other host devices, through interaction with multiple storage arrays in a remote replication environment. Such MPIO drivers illustratively form a multi-path layer or MPIO layer comprising multi-pathing software of the host devices. Other types of multi-pathing software and host drivers can be used in other embodiments.

Interactions between the host devices and the storage arrays via the MPIO layer are illustratively carried out using commands of a standard storage access protocol such as the above-noted SCSI and NVMe access protocols, can be used in other embodiments. Other types of commands such as "vendor unique" or VU commands may be used.

The above-described functions associated with write pressure reduction in the MPIO driver 112-1 are illustratively carried out at least in part under the control of its path selection logic 114-1. For example, the path selection logic 114-1 is illustratively configured to at least temporarily limit a manner in which write requests are delivered from host device 102-1 to the first storage array 105-1 in a corresponding step of the flow diagram to be described below in conjunction with FIG. 2. In other embodiments, such a portion of the FIG. 2 process can be performed at least in part by other host device components, such as by one or more host device processors and/or associated control logic instances.

In some embodiments, the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed write pressure reduction functionality. Accordingly, write pressure reduction functionality as described above in the context of the first MPIO driver 112-1 in some embodiments is additionally or alternatively implemented in a similar manner by the other MPIO driver 112-2.

The MPIO drivers 112 in some embodiments can include well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support write pressure reduction.

It is to be appreciated that the above-described features of systems 100 and 100' as and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the systems 100 and 100' as illustrated in FIGS. 1A and 1B are presented by way of example only. In other embodiments, only subsets of these components, or additional or alternative sets of components, may be used, and such components may exhibit alternative functionality and configurations.

The operation of the information processing systems 100 and 100' will now be described in further detail with reference to the flow diagram of the illustrative embodiment of FIG. 2. The process as shown includes steps 200 through 206, and is suitable for use in the systems 100 and 100' but is more generally applicable to other types of systems comprising one or more host devices and at least first and second storage systems. The storage systems in this embodiment are assumed to more particularly comprise respective first and second storage arrays each comprising a plurality of storage devices. The storage devices of the first and second storage arrays are assumed to include logical storage devices such as LUNs or other logical storage volumes.

Figure 2:
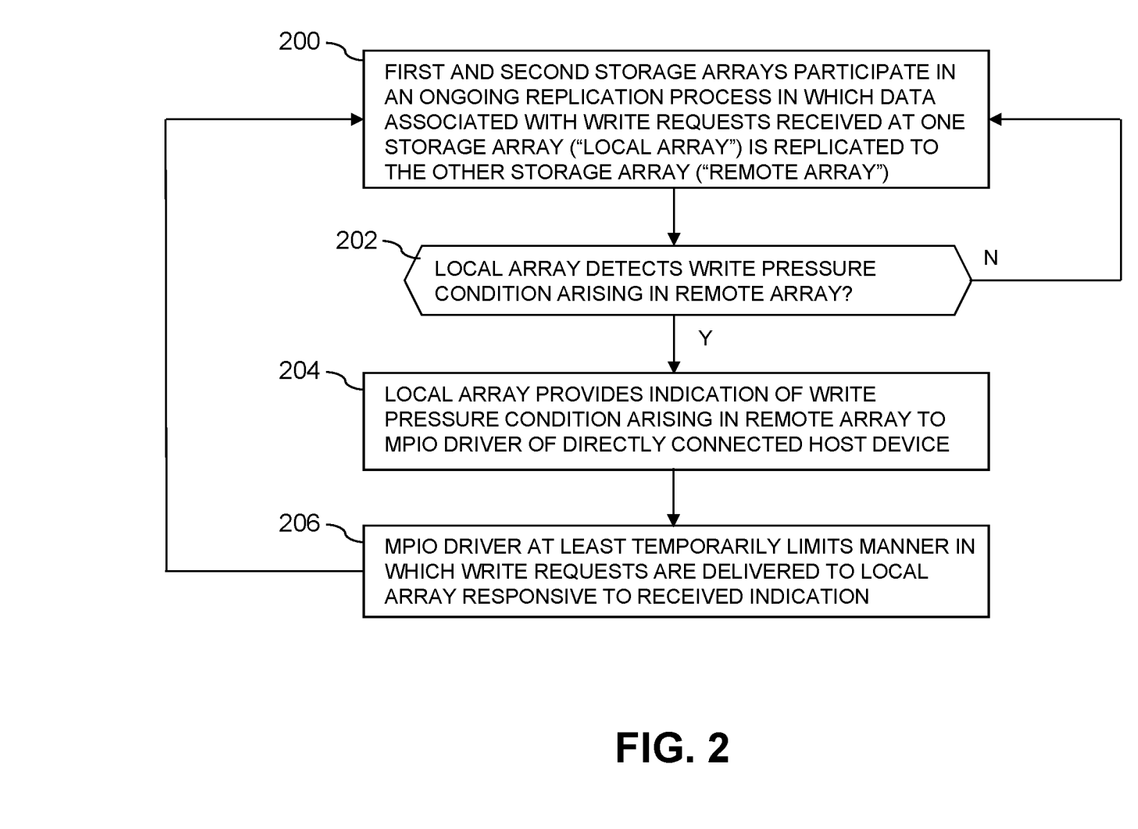
FIG. 2 is a flow diagram of a process that implements write pressure reduction for remote replication utilizing a multi-path layer of a host device in an illustrative embodiment.

The steps of the FIG. 2 process are illustratively performed by first and second storage arrays where at least the first storage array has direct connectivity to at least one host device via a SAN or other network. For example, the first and second storage arrays of the FIG. 2 process illustratively correspond to first and second storage arrays 105-1 and 105-2 where at least the first storage array 105-1 has direct connectivity to at least the first host device 102-1 comprising the MPIO driver 112-1 as illustrated in FIGS. 1A and 1B, although other arrangements of system components can perform at least portions of one or more of the steps of the FIG. 2 process in other embodiments. The functionality of the FIG. 2 process is illustratively performed in conjunction with a load balancing algorithm or other path selection algorithm executed by the path selection logic 114-1.

In step 200, the first and second storage arrays participate in an ongoing replication process in which data associated with write requests received at one storage array ("local array") is replicated to the other storage array ("remote array"). For example, one or more source storage volumes of the first storage array 105-1 are illustratively subject to synchronous replication to corresponding target storage volumes of the second storage array 105-2 in the embodiments of FIGS. 1A and 1B. Other types of replication processes involving at least one of synchronous and asynchronous replication can be used.

In step 202, a determination is made by the local array as to whether or not a write pressure condition arising in the remote array has been detected by the local array. For example, first storage array 105-1 can detect a write pressure condition arising in second storage array 105-2 in the embodiments of FIGS. 1A and 1B, even if the first storage array 105-1 is not itself currently experiencing a write pressure condition. If such a write pressure condition arising in the remote array is detected by the local array, the process moves to step 204, and otherwise returns to step 200 as indicated.

In step 204, the local array provides an indication of the detected write pressure condition arising in remote array to an MPIO driver of a directly connected host device. For example, first storage array 105-1 can provide the indication to MPIO driver 112-1 of first host device 102-1 in the embodiments of FIGS. 1A and 1B.

In step 206, the MPIO driver at least temporarily limits a manner in which write requests are delivered to the local array responsive to the received indication.

The various steps of the FIG. 2 process are illustratively shown as being performed serially, but certain steps can at least partially overlap with other steps. For example, performance of step 200 can be substantially continuous during the process, with steps 202, 204 and 206 being performed in parallel with step 200 as needed.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and write pressure reduction functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different write pressure reduction arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
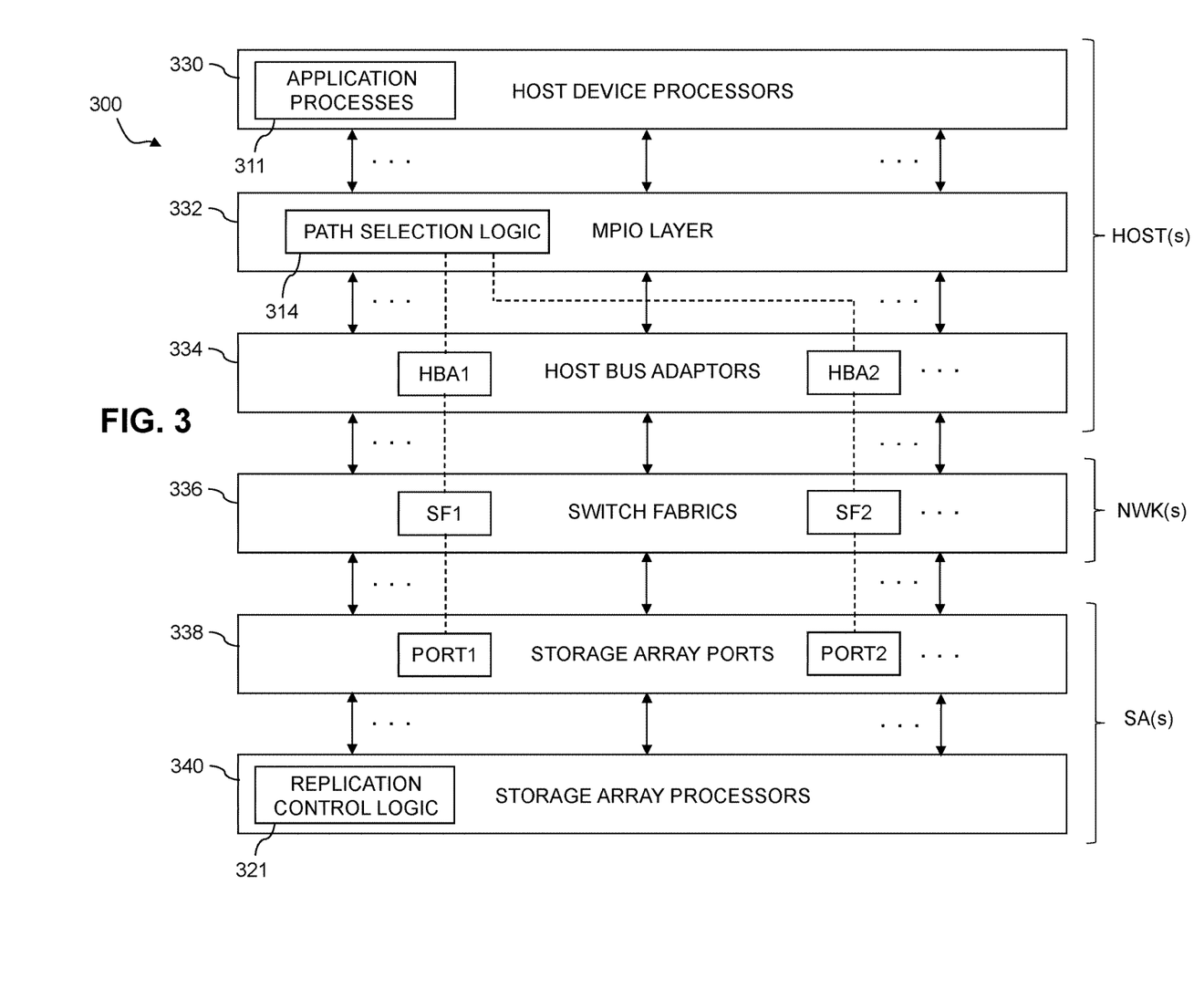
FIG. 3 is a block diagram showing multiple layers of a layered system architecture that includes a multi-path layer supporting write pressure reduction for remote replication in an illustrative embodiment.

Referring now to FIG. 3, another illustrative embodiment is shown. In this embodiment, an information processing system 300 comprises application processes 311, path selection logic 314 and replication control logic 321. The system 300 is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements write pressure reduction in conjunction with replication of one or more logical storage devices across first and second storage arrays, illustratively arranged in an active-active configuration or other replication configuration relative to one another, in a manner similar to that described elsewhere herein. The application processes 311 are illustratively running in one or more host device processors of the host device processor layer 330. The write pressure reduction functionality in this embodiment is assumed to be controlled at least in part by path selection logic 314 of the MPIO layer 332, although other arrangements are possible.

The MPIO layer 332 is an example of what is also referred to herein as a multi-path layer, and comprises one or more MPIO drivers implemented in respective host devices. Each such MPIO driver illustratively comprises an instance of path selection logic 314 configured to implement functionality for write pressure reduction in conjunction with replication of one or more logical storage devices across first and second storage arrays as previously described. Additional or alternative layers and path selection logic arrangements can be used in other embodiments.

The replication control logic 321 implemented in the storage array processor layer 340 controls the active-active configuration of a given pair of storage arrays, or other types of replication arrangements implemented in the system 300. For example, the replication control logic 321 can include functionality for carrying out a synchronous replication process between first and second storage arrays in the active-active configuration. It is also possible in some embodiments that the replication control logic 321 can include multiple distinct replication control logic instances for respective ones of a plurality of storage arrays of the system 300. Although not explicitly shown in the figure, additional replication control logic is illustratively implemented in the host device processor layer 330, or elsewhere in the system 300, such as in the MPIO layer 332.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a particular number and type of paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338.

In the FIG. 3 embodiment, a remote storage array under write pressure will indicate to the local array (i.e., the array receiving the host write commands from one or more host devices and sending them to the array under pressure) that it is under write pressure. The local array will then notify the MPIO layer 332 of the one or more host devices sending the write commands, possibly using indicators of the type described elsewhere herein, so that the MPIO layer 332 will lower the rate at which write commands are sent, thus lowering the write pressure on the remote array that is currently experiencing the write pressure. Such an algorithm for reducing write pressure can be varied in other embodiments.

Accordingly, in this embodiment the host devices of system 300 through their respective MPIO drivers and respective instances of path selection logic 314 interact with at least one storage array to provide functionality for write pressure reduction in conjunction with replication of one or more logical storage devices across multiple storage arrays, possibly with involvement of other host device or system components.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Again, different instances of the above-described write pressure reduction process can involve different MPIO drivers in different host devices.

These particular steps are illustrative only, and additional or alternative steps can be used in other embodiments. Also, although shown as being performed serially, one or more of the steps may each at least partially overlap with other ones of the steps.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as PowerPath® drivers commercially available from Dell EMC. Other embodiments can be implemented in other MPIO drivers from other multi-pathing software vendors.

Moreover, other host device components, such as logic instances and/or host processors, can additionally or alternatively be used.

Other types of write pressure reduction involving alteration of load balancing logic or other path selection logic can be implemented in one or more host devices in other embodiments in conjunction with replication of one or more logical storage devices across first and second storage arrays.

Some embodiments include only a single host device, although multiple host devices are used in illustrative embodiments. For example, a single host device can be connected to two storage arrays that are arranged in an active-active configuration.

Also, it should be noted that other arrangements of multiple host devices can be used. For example, multiple host devices in illustrative embodiments can be arranged in a cluster and the host devices can be arranged in active-passive configurations, active-active configurations, or combinations thereof.

The particular write pressure reduction arrangements described above are presented by way of illustrative example only. Numerous alternative arrangements of these and other features can be used in implementing write pressure reduction in other embodiments.

The illustrative embodiments disclosed herein can provide a number of significant advantages relative to conventional arrangements.

For example, some embodiments configure a host device to include write pressure reduction functionality in conjunction with replication of one or more logical storage devices across multiple storage systems, such as first and second storage systems arranged in an active-active configuration. In these and numerous other remote replication arrangements, the disclosed techniques can advantageously reduce write pressure in the second storage system, even if only the first storage system has direct connectivity to one or more host devices that are generating IO operations.

In some embodiments, at least a portion of the write pressure reduction functionality is implemented in a multi-path layer that comprises at least one MPIO driver configured to process IO operations of at least one host device that communicates with multiple storage arrays or other types of storage systems.

Additionally or alternatively, illustrative embodiments disclosed herein can advantageously prevent situations in which a remote storage array might otherwise become overloaded due to excessive numbers of write commands arriving from each of multiple host-connected storage arrays. Similar advantages are provided in numerous other remote replication environments and configurations.

The disclosed functionality can be implemented using a wide variety of types of host devices each configured to interact with multiple distinct storage arrays or other types of storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the systems 100 and 100'. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic and additional or alternative components. Also, the particular configurations of system and device elements and associated processing operations illustratively shown in the drawings can be varied in other embodiments. For example, a wide variety of different host device configurations and associated write pressure reduction arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
    at least one processing device comprising a processor coupled to a memory;
    wherein the at least one processing device is configured:
    to send write requests to a first storage system, the first storage system being configured to participate in a replication process in which data associated with the write requests is replicated from the first storage system to a second storage system that is separate from the first storage system, the data associated with a given one of the write requests thereby being stored in both the first storage system and the second storage system in accordance with the replication process;
    to receive from the first storage system an indication of a write pressure condition arising in the second storage system and relating to replication of the data associated with the write requests from the first storage system to the second storage system; and
    to at least temporarily limit a manner in which additional write requests are sent to the first storage system responsive to the received indication of the write pressure condition arising in the second storage system;
    wherein the indication of the write pressure condition arising in the second storage system that is received from the first storage system is sent by the first storage system to indicate the write pressure condition arising in the second storage system even though the first storage system is not itself experiencing any write pressure condition.

2. The apparatus of claim 1 wherein the first and second storage systems comprise respective distinct production and recovery storage arrays at respective different physical sites.

3. The apparatus of claim 1 wherein the first and second storage systems are arranged in an active-active configuration relative to one another.

4. The apparatus of claim 1 wherein the first storage system has direct connection to one or more host devices that generate the write requests, but the second storage system has no direct connection to the one or more host devices that generate the write requests.

5. The apparatus of claim 1 wherein the replication process comprises at least one of asynchronous replication and synchronous replication.

6. The apparatus of claim 1 wherein said at least one processing device comprises at least a portion of a host device configured to generate the write requests.

7. The apparatus of claim 1 wherein said at least one processing device comprises a multi-path input-output driver of a host device, with the multi-path input-output driver being configured to control the delivery of the write requests to the first storage system over selected ones of a plurality of paths through a network.

8. The apparatus of claim 7 wherein the paths are associated with respective initiator-target pairs, the initiators being implemented on the host device and the targets being implemented on the first storage system.

9. An apparatus comprising:
at least one processing device comprising a processor coupled to a memory;
wherein the at least one processing device is configured:
to send write requests to a first storage system, the first storage system being configured to participate in a replication process in which data associated with the write requests is replicated from the first storage system to a second storage system that is separate from the first storage system, the data associated with a given one of the write requests thereby being stored in both the first storage system and the second storage system in accordance with the replication process;
to receive from the first storage system an indication of a write pressure condition arising in the second storage system and relating to replication of the data associated with the write requests from the first storage system to the second storage system; and
to at least temporarily limit a manner in which additional write requests are sent to the first storage system responsive to the received indication of the write pressure condition arising in the second storage system;
wherein said at least one processing device comprises a multi-path input-output driver of a host device, with the multi-path input-output driver being configured to control the delivery of the write requests to the first storage system over selected ones of a plurality of paths through a network;
wherein the paths are associated with respective initiator-target pairs, the initiators being implemented on the host device and the targets being implemented on the first storage system; and
wherein the initiators of the initiator-target pairs comprise respective host bus adaptors of the host device and the targets of the initiator-target pairs comprise respective storage array ports of the first storage system.

10. The apparatus of claim 7 wherein the multi-path input-output driver is further configured to perform at least a portion of the sending of write requests to the first storage system, the receiving of the indication of the write pressure condition arising in the second storage system, and the at least temporarily limiting a manner in which additional write requests are sent to the first storage system.

11. The apparatus of claim 1 wherein the indication of the write pressure condition comprises at least one of a check-condition notification and a queue-full notification.

12. The apparatus of claim 1 wherein at least temporarily limiting a manner in which additional write requests are sent to the first storage system responsive to the received indication of the write pressure condition arising in the second storage system comprises reducing a rate at which the additional write requests are sent to the first storage system.

13. The apparatus of claim 1 wherein said at least one processing device is further configured:
to receive from the first storage system an indication of a write pressure condition arising in the first storage system; and
to at least temporarily limit a manner in which additional write requests are sent to the first storage system responsive to the received indication of the write pressure condition arising in the first storage system.

14. The apparatus of claim 1 wherein the first storage system is one of a plurality of host-connected storage arrays having direct connections to one or more host devices and the second storage system comprises a storage array having no direct connection to the one or more host devices but instead configured to serve as a replication target for each of the plurality of host-connected storage arrays.

15. A computer program product comprising a non-transitory processor-readable storage medium having stored therein program code of one or more software programs, wherein the program code, when executed by at least one processing device comprising a processor coupled to a memory, causes the at least one processing device:
to send write requests to a first storage system, the first storage system being configured to participate in a replication process in which data associated with the write requests is replicated from the first storage system to a second storage system that is separate from the first storage system, the data associated with a given one of the write requests thereby being stored in both the first storage system and the second storage system in accordance with the replication process;
to receive from the first storage system an indication of a write pressure condition arising in the second storage system and relating to replication of the data associated with the write requests from the first storage system to the second storage system; and
to at least temporarily limit a manner in which additional write requests are sent to the first storage system responsive to the received indication of the write pressure condition arising in the second storage system;
wherein the indication of the write pressure condition arising in the second storage system that is received from the first storage system is sent by the first storage system to indicate the write pressure condition arising in the second storage system even though the first storage system is not itself experiencing any write pressure condition.

16. The computer program product of claim 15 wherein the indication of the write pressure condition comprises at least one of a check-condition notification and a queue-full notification.

17. The computer program product of claim 15 wherein at least temporarily limiting a manner in which additional write requests are sent to the first storage system responsive to the received indication of the write pressure condition arising in the second storage system comprises reducing a rate at which the additional write requests are sent to the first storage system.

18. A method comprising:
sending write requests to a first storage system, the first storage system being configured to participate in a replication process in which data associated with the write requests is replicated from the first storage system to a second storage system that is separate from the first storage system, the data associated with a given one of the write requests thereby being stored in both the first storage system and the second storage system in accordance with the replication process;

receiving from the first storage system an indication of a write pressure condition arising in the second storage system and relating to replication of the data associated with the write requests from the first storage system to the second storage system; and at least temporarily limiting a manner in which additional write requests are sent to the first storage system responsive to the received indication of the write pressure condition arising in the second storage system;

wherein the indication of the write pressure condition arising in the second storage system that is received from the first storage system is sent by the first storage system to indicate the write pressure condition arising in the second storage system even though the first storage system is not itself experiencing any write pressure condition; and wherein the method is performed by at least one processing device comprising a processor coupled to a memory.

19. The method of claim 18 wherein the indication of the write pressure condition comprises at least one of a check-condition notification and a queue-full notification.

20. The method of claim 18 wherein at least temporarily limiting a manner in which additional write requests are sent to the first storage system responsive to the received indication of the write pressure condition arising in the second storage system comprises reducing a rate at which the additional write requests are sent to the first storage system.

* * * * *